US010141867B2

(12) United States Patent
Yang

(10) Patent No.: US 10,141,867 B2
(45) Date of Patent: Nov. 27, 2018

(54) SWITCHING CONTROL CIRCUIT WITH SIGNAL PROCESS TO ACCOMMODATE THE SYNCHRONOUS RECTIFIER OF POWER CONVERTERS

(71) Applicant: SEMICONDUCTOR COMPONENTS INDUSTRIES, LLC, Phoenix, AZ (US)

(72) Inventor: Ta-Yung Yang, Milpitas, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/673,347

(22) Filed: Aug. 9, 2017

(65) Prior Publication Data

US 2017/0338749 A1 Nov. 23, 2017

Related U.S. Application Data

(63) Continuation of application No. 13/867,248, filed on Apr. 22, 2013, now Pat. No. 9,762,144.

(Continued)

(51) Int. Cl.
*H02M 3/335* (2006.01)
*H02M 7/537* (2006.01)
(Continued)

(52) U.S. Cl.
CPC .......... *H02M 7/537* (2013.01); *H02H 7/1227* (2013.01); *H02M 3/33507* (2013.01);
(Continued)

(58) Field of Classification Search
CPC ......... H02M 3/33538; H02M 3/33546; H02M 3/33515; H02M 3/33576; H02M 3/33553;
(Continued)

(56) References Cited

U.S. PATENT DOCUMENTS 6,995,991 B1 * 2/2006 Yang ................. H02M 3/33592
363/21.14
7,362,592 B2 4/2008 Yang et al.
(Continued)

FOREIGN PATENT DOCUMENTS

CN 101488714 A 7/2009
CN 101820229 A 9/2010
(Continued)

OTHER PUBLICATIONS

Xunwei Zhou et al., "Improved Light-Load Efficiency for Synchronous Rectifier Voltage Regulator Module," IEEE Transactions on Power Electronics, vol. 15, No. 5, Sep. 2000, pp. 826-834.

*Primary Examiner* — Timothy J Dole
*Assistant Examiner* — Bryan R Perez
(74) *Attorney, Agent, or Firm* — Robert F. Hightower

(57) ABSTRACT

A switching control circuit of a power converter according to the present invention comprises an input circuit and a clock generator. The input circuit is coupled to receive a feedback signal for generating a switching signal. The clock generator generates a clock signal to determine a switching frequency of the switching signal. The feedback signal is correlated to an output of the power converter. The switching signal is coupled to switch a transformer of the power converter for regulating the output of the power converter. The pulse width of the switching signal is reduced before the switching frequency of the switching signal is changed from a low frequency to a high frequency.

20 Claims, 7 Drawing Sheets

Related U.S. Application Data

(60) Provisional application No. 61/636,962, filed on Apr. 23, 2012.

(51) Int. Cl.
 *H02H 7/122* (2006.01)
 *H02M 1/32* (2007.01)

(52) U.S. Cl.
 CPC .......... *H02M 1/32* (2013.01); *H02M 3/33592* (2013.01); *Y02B 70/1475* (2013.01)

(58) Field of Classification Search
 CPC ......... H02M 3/33507; H02M 3/33592; H02M 3/33523; H02M 3/3353; H02M 3/33569
 USPC ..... 363/21.06, 21.14, 127, 20, 21.04, 21.05, 363/21.07, 21.08, 21.09, 21.1, 21.11, 363/21.12, 21.13, 21.15, 21.16, 21.17, 363/21.18
 See application file for complete search history.

(56) References Cited

U.S. PATENT DOCUMENTS

| | | | |
|---|---|---|---|
| 7,362,593 B2 | 4/2008 | Yang et al. | |
| 7,440,298 B2 | 10/2008 | Yang | |
| 7,511,466 B2 | 3/2009 | Yang | |
| 7,746,673 B2 | 6/2010 | Grant et al. | |
| 8,023,289 B2 | 9/2011 | Yang et al. | |
| 8,154,888 B2 | 4/2012 | Yang et al. | |
| 2008/0025054 A1 | 1/2008 | Yang et al. | |
| 2008/0037302 A1 | 2/2008 | Yang | |
| 2008/0169802 A1 | 7/2008 | Yang et al. | |
| 2009/0160414 A1* | 6/2009 | Hachiya | H02M 3/156 323/283 |
| 2010/0097104 A1 | 4/2010 | Yang et al. | |
| 2010/0320989 A1* | 12/2010 | Chang | H02M 3/33523 323/285 |
| 2010/0321962 A1* | 12/2010 | Lee | H02M 3/33523 363/21.12 |
| 2012/0139342 A1 | 6/2012 | Bailey et al. | |

FOREIGN PATENT DOCUMENTS

| | | |
|---|---|---|
| JP | 4322161 H | 11/1992 |
| TW | 2010027893 A | 7/2010 |

\* cited by examiner

SWITCHING CONTROL CIRCUIT WITH SIGNAL PROCESS TO ACCOMMODATE THE SYNCHRONOUS RECTIFIER OF POWER CONVERTERS

REFERENCE TO RELATED APPLICATION

This Application is based on Provisional Application Ser. No. 61/636,962, filed 23 Apr. 2013, and priority thereto is hereby claimed. The present application is also a continuation application of prior U.S. application Ser. No. 13/867,248, filed on Apr. 22, 2013, which is hereby incorporated herein by reference, and priority thereto for common subject matter is hereby claimed.

BACKGROUND OF THE INVENTION

Filed of Invention

The present invention relates to a power converter, and more particularly, the present invention relates to a switching control circuit of the power converter.

Description of Related Art

FIG. 1 shows a circuit diagram of a switching power converter. A switching control circuit 70 generates a switching signal $S_W$ in accordance with a feedback signal $V_{FB}$. The feedback signal $V_{FB}$ is correlated to an output $V_O$ of the power converter. The switching signal $S_W$ is coupled to switch a transformer 10 of the power converter through a transistor 20. Thus, the transformer 10 will deliver the power from an input $V_{IN}$ of the power converter to the output $V_O$ of the power converter via a transistor 40 and a capacitor 50. The transformer 10 has a primary side and a secondary side. The input $V_{IN}$ is supplied to a primary winding $N_P$ at the primary side and the output $V_O$ is generated at the secondary side. The secondary side has a secondary winding $N_S$. The transistor 40 is coupled between a first terminal of the secondary winding $N_S$ and an output terminal of the power converter. The capacitor 50 is coupled to a second terminal of the secondary winding $N_S$ and the output terminal of the power converter.

A rectifier 45 is parallel connected to the transistor 40. It can be a separated diode or a parasitic diode of the transistor 40. A SR controller 90 associates with the transistor 40 developed a synchronous rectifier (SR) at the secondary side of the transformer 10. Further, a switching current $I_P$ flows through the primary winding $N_P$ of the transformer 10 and the transistor 20 when the transistor 20 is turned on. A resistor 30 is coupled between the transistor 20 and a ground to detect the switching current $I_P$ of the transformer 10 for generating a current-sense signal $V_{CS}$. The current-sense signal $V_{CS}$ is coupled to the switching control circuit 70.

Many prior arts had disclosed the skill of the synchronous rectifying, such as, "PWM controller for synchronous rectifier of flyback power converter" U.S. Pat. No. 6,995,991; "Synchronous rectification circuit for power converters" U.S. Pat. No. 7,440,298; "Method and apparatus for predicting discharge time of magnetic device for power converter" U.S. Pat. No. 7,511,466; "Offline synchronous rectifier with causal circuit for resonant switching power converter" U.S. Pat. No. 8,023,289; "Offline synchronous rectifier circuit with turned-on arbiter and phase-lock for switching power converters" U.S. Pat. No. 8,154,888.

Many controllers (e.g. the SR controller 90) of synchronous rectifying include the phase lock circuit to detect the switching waveform of the transformer 10 and predict the turn-on time of the SR transistor (such as the transistor 40). The response time of the phase lock circuit is limited, which restricts the maximum operation frequency and speed of the switching control circuit (e.g. the switching control circuit 70).

The present invention provides a signal process in the switching control circuit, which allows the switching control circuit can operate at high frequency without the limitation of the synchronous rectifier.

BRIEF SUMMARY OF THE INVENTION

The object of the present invention is to provide a switching control circuit with signal process to accommodate the synchronous rectifier of the power converter. The switching control circuit can operate at high frequency without the limitation of the synchronous rectifier.

A switching control circuit of a power converter according to the present invention comprises an input circuit and a clock generator. The input circuit is coupled to receive a feedback signal for generating a switching signal. The clock generator generates a clock signal to determine a switching frequency of the switching signal. The feedback signal is correlated to an output of the power converter. The switching signal is coupled to switch a transformer of the power converter for regulating the output of the power converter. The pulse width of the switching signal is reduced before the switching frequency of the switching signal is changed from a low frequency to a high frequency.

BRIEF DESCRIPTION OF ACCOMPANIED DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF EMBODIMENTS

Figure 1:
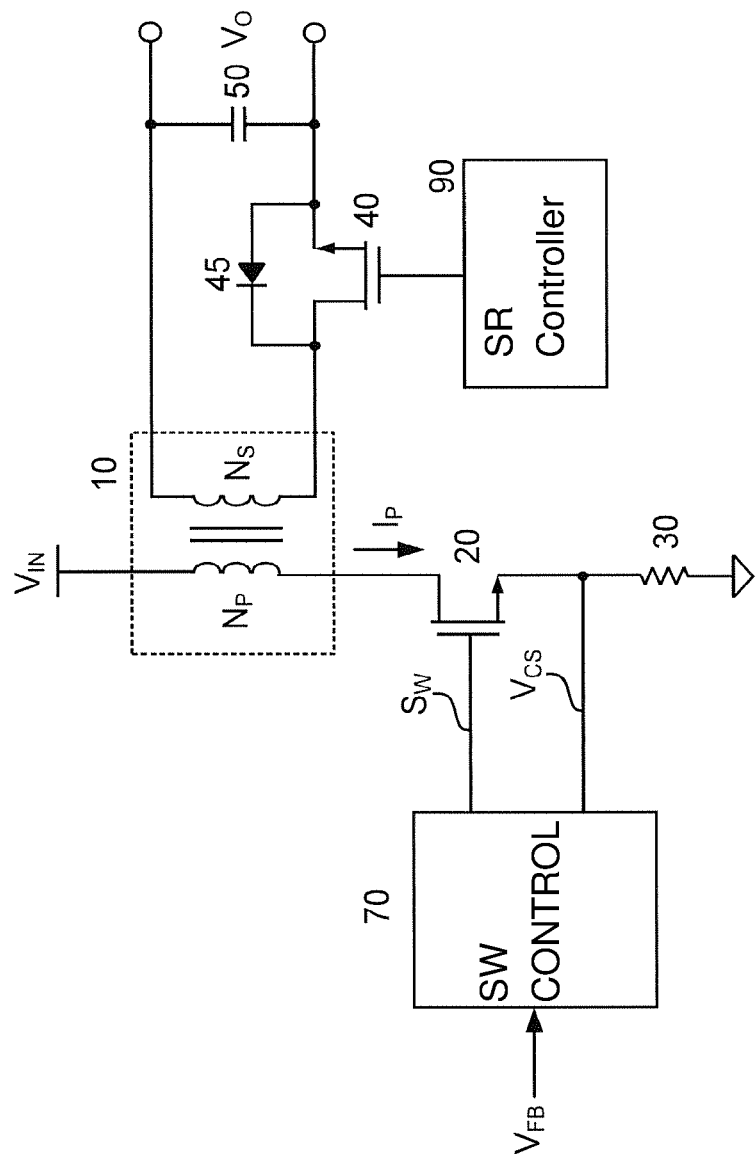
FIG. 1 shows a circuit diagram of a switching power converter.
Figure 2:
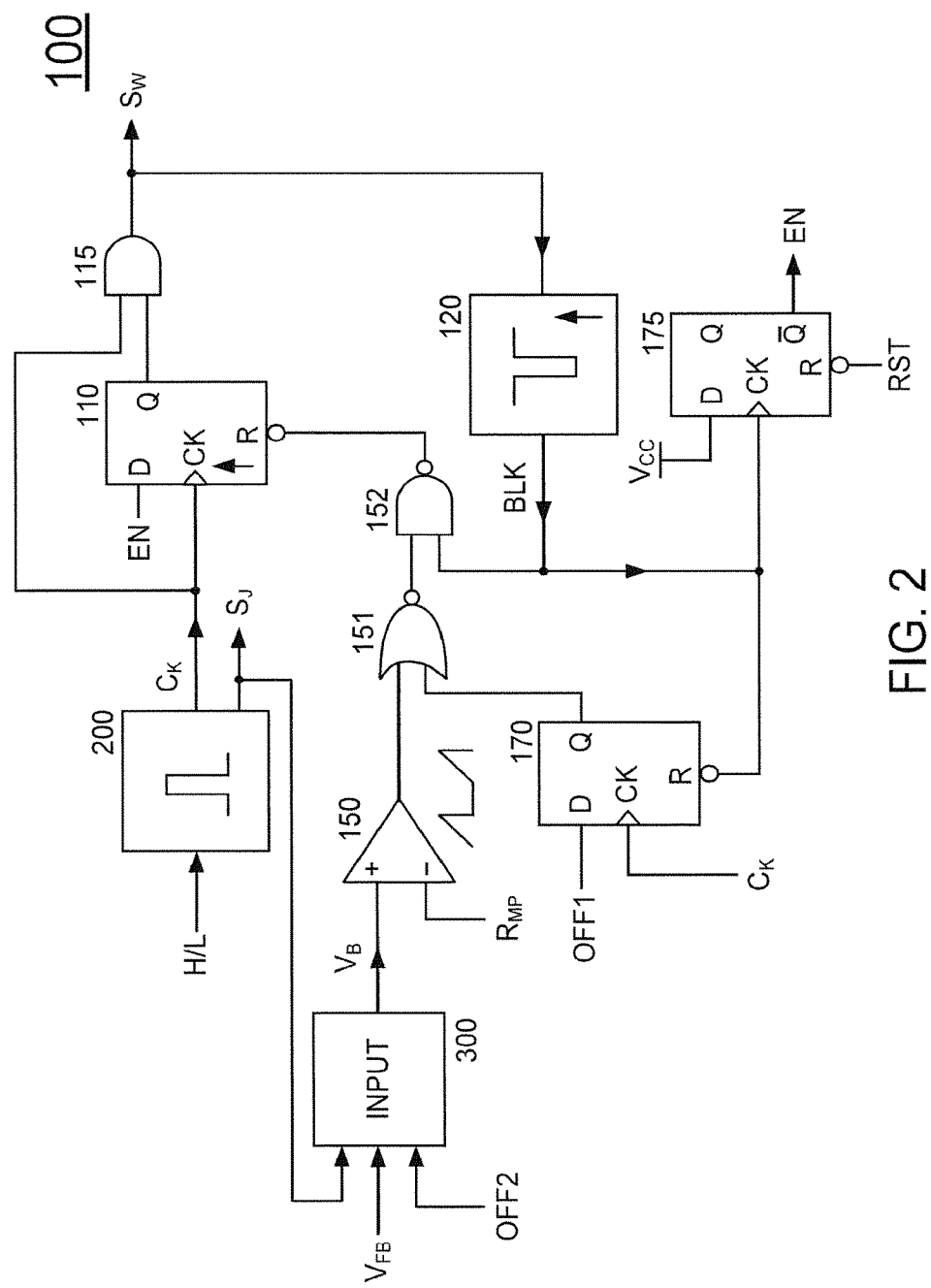
FIG. 2 is a circuit diagram of an embodiment of the switching control circuit in accordance with the present invention.

FIG. 2 is a circuit diagram of an embodiment of a switching control circuit in accordance with the present invention. The switching control circuit 100 is also a controller that comprises a switching circuit coupled to receive the feedback signal $V_{FB}$ for generating the switching signal $S_W$. The switching circuit includes a logic circuit and an input circuit (INPUT) 300. The logic circuit includes a flip-flop 110, an AND gate 115, a comparator 150, an NOR gate 151, and an NAND gate 152. A clock generator 200 generates a clock signal $C_K$ coupled to determine the switching frequency of the switching signal $S_W$. The clock signal $C_K$ is coupled to a clock input terminal CK of the flip-flop 110. An input terminal D of the flip-flop 110 is coupled to receive an enable signal EN. An output terminal Q of the flip-flop 110 is coupled to a first input terminal of the AND gate 115. A second input terminal of the AND gate 115 is coupled to receive the clock signal $C_K$. An output terminal of the AND gate 115 generates the switching signal $S_W$. The switching signal $S_W$ is coupled to control the transistor 20 to switch the transformer 10 (as shown in FIG. 1) of the power converter for regulating the output $V_O$ of the power converter.

The input circuit 300 is coupled to receive the feedback signal $V_{FB}$ and generate a modulated feedback signal $V_B$. The modulated feedback signal $V_B$ is coupled to disable the flip-flop 110 and the switching signal $S_W$ via the comparator 150, the NOR gate 151 and the NAND gate 152. The modulated feedback signal $V_B$ is coupled to a positive input terminal of the comparator 150. A ramp signal $R_{MP}$ is produced from the clock generator 200 and/or from the current-sense signal $V_{CS}$. The ramp signal $R_{MP}$ is connected to a negative input terminal of the comparator 150 to disable the switching signal $S_W$ once the ramp signal $R_{MP}$ is higher than the modulated feedback signal $V_B$. An output terminal of the comparator 150 is coupled to a first input terminal of the NOR gate 151. An output terminal of the NOR gate 151 is coupled to a first input terminal of the NAND gate 152. An output terminal of the NAND gate 152 is coupled to a reset input terminal R of the flip-flop 110 to reset the flip-flop 110 for disabling the switching signal $S_W$.

A frequency modulation signal H/L is utilized to program the switching frequency of the switching signal $S_W$. The frequency modulation signal H/L is applied to the clock generator 200 to modulate the frequency of the clock signal $C_K$ for modulating the switching frequency of the switching signal $S_W$, and the clock generator 200 generates an on-time adjust signal $S_J$ coupled to the input circuit 300 in response to the frequency modulation signal H/L. The on-time adjust signal $S_J$ is utilized to adjust the pulse width (on-time) of the switching signal $S_W$. Before the switching frequency of the switching signal $S_W$ changes from a low frequency to a high frequency, the pulse width (on-time) of the switching signal $S_W$ will be reduced in advance. This on-time adjustment is done before the switching frequency of the switching signal $S_W$ is changed, which can achieve a proper operation for the synchronous rectifier (transistor 40) at the secondary winding $N_S$ (secondary side) of the transformer 10.

Two protection signals OFF1 and OFF2 are applied to disable the switching signal $S_W$ in response to the protection of the power converter. The first protection signal OFF1 (such as the over-voltage protection (OVP)) is applied to a protection circuit to disable the switching signal $S_W$ immediately. The first protection signal OFF1 is thus coupled to reduce the pulse width of the switching signal $S_W$ before disabling the switching signal $S_W$. The protection circuit includes a flip-flop 170. The first protection signal OFF1 is coupled to an input terminal D of the flip-flop 170. The clock signal $C_K$ is connected to a clock input terminal CK of the flip-flop 170 to set flip-flop 170 when the first protection signal OFF1 is enabled. An output terminal Q of the flip-flop 170 is coupled to disable the path for the reset of the flip-flop 110 through NOR gate 151, which allows the clock signal $C_K$ to turn on (enable) the switching signal $S_W$ with a specific pulse width (on-time).

Once the switching signal $S_W$ is on state in response to the enable of the first protection signal OFF1, a pulse generator 120 generates a pulse signal BLK coupled to a second input terminal of the NAND gate 152 in response to the switching signal $S_W$ to determine this specific pulse width of the switching signal $S_W$. Therefore, the pulse width of the switching signal $S_W$ is decreased to the specific value before the switching signal $S_W$ is disabled for the protection of the power converter. After the pulse signal BLK is generated, the pulse signal BLK will trigger a flip-flop 175 for latching off the enable signal EN. The enable signal EN coupled to the flip-flop 110 is utilized to enable the flip-flop 110 for generating the switching signal $S_W$. The pulse signal BLK is coupled to a clock input terminal CK of the flip-flop 175. An input terminal D of the flip-flop 175 is coupled to receive a supply voltage $V_{CC}$. An output terminal/Q of the flip-flop 175 generates the enable signal EN. A reset signal RST is coupled to a reset input terminal R of the flip-flop 175 to reset the flip-flop 175. The pulse signal BLK is further coupled to a reset input terminal R of the flip-flop 170 to reset the flip-flop 170.

Figure 5:
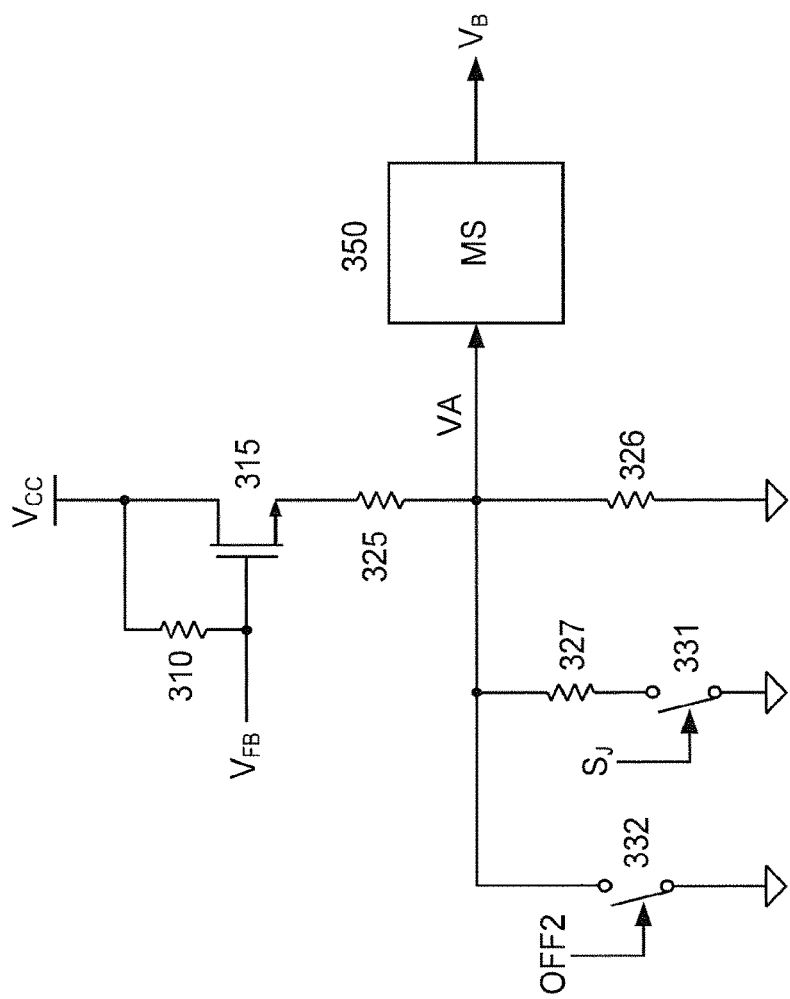
FIG. 5 is a circuit diagram of an embodiment of the input circuit according to the present invention.

The second protection signal OFF2 (such as the over-temperature protection, the open-loop protection, the brown-out protection, etc.) is coupled to the input circuit 300 to disable the switching signal $S_W$ through a micro-stepping circuit (MS) 350 (as shown in FIG. 5) that decreases the pulse width of the switching signal $S_W$ step by step in response to the feedback signal $V_{FB}$.

Figure 3:
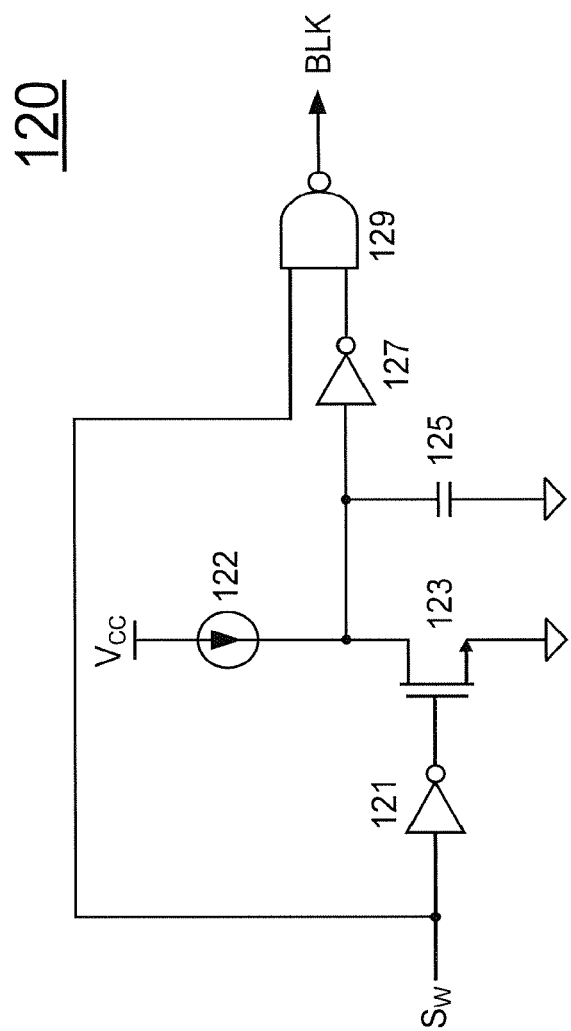
FIG. 3 is a circuit diagram of an embodiment of the pulse generator in accordance with the present invention.

FIG. 3 is a circuit diagram of an embodiment of the pulse generator 120 according to the present invention. The pulse generator 120 comprises inverters 121, 127, a current source 122, a transistor 123, a capacitor 125, and an NAND gate 129. The switching signal $S_W$ is coupled to a gate of the transistor 123 to control the transistor 123 through the inverter 121. One terminal of the current source 122 is coupled to the supply voltage $V_{CC}$. The other terminal of the current source 122 is coupled to a drain of the transistor 123, one terminal of the capacitor 125 and an input terminal of the inverter 127. A source of the transistor 123 and the other terminal of the capacitor 125 are coupled to the ground. The capacitor 125 is charged by the current source 122 when the switching signal $S_W$ is on state. An output terminal of the inverter 127 is coupled to a first input terminal of the NAND gate 129. A second input terminal of the NAND gate 129 is coupled to receive the switching signal $S_W$. An output terminal of the NAND gate 129 generates the pulse signal BLK. The pulse width of the pulse signal BLK is determined by the level of the current source 122 and capacitance of the capacitor 125. That is, the level of the current source 122 and capacitance of the capacitor 125 determine the specific pulse width of the switching signal $S_W$.

Figure 4:
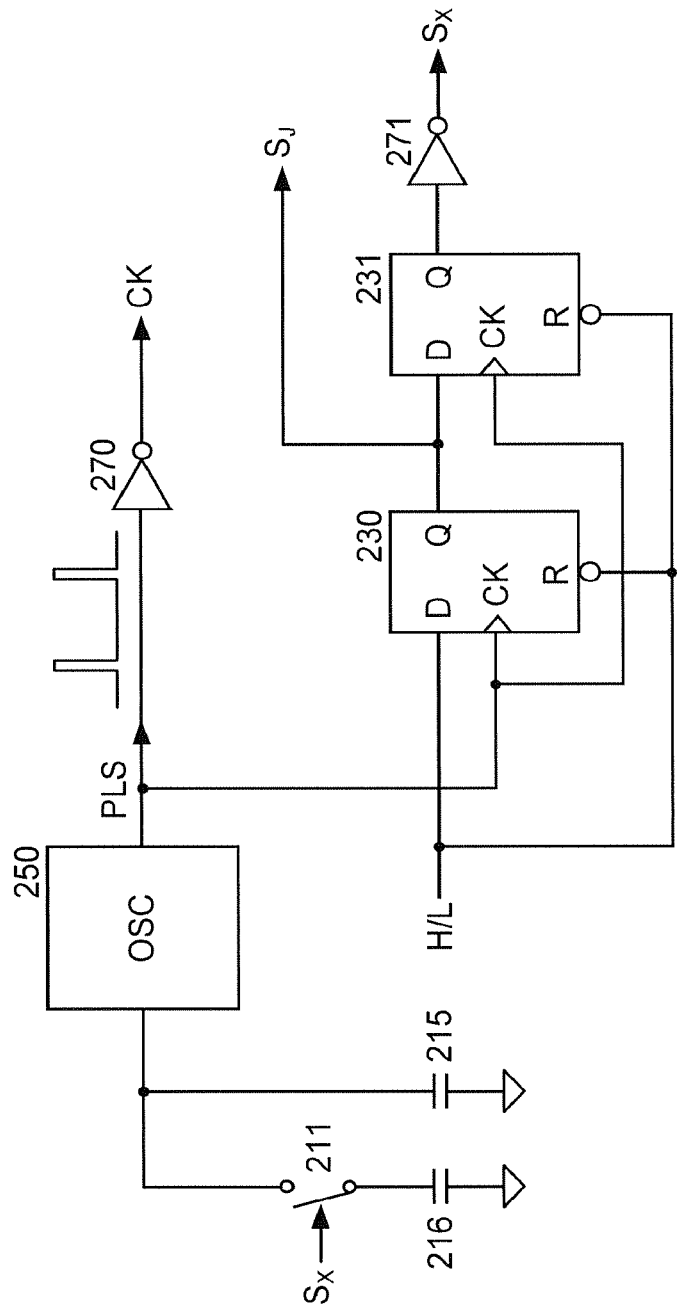
FIG. 4 is a circuit diagram of an embodiment of the clock generator according to the present invention.

FIG. 4 is a circuit diagram of an embodiment of the clock generator 200 according to the present invention. A capacitor 215 and a capacitor 216 are coupled to a signal generator (OSC) 250 to determine the frequency of the clock signal $C_K$. A switch 211 coupled between the capacitor 216 and the signal generator 250 is controlled by a signal $S_X$ for switching the capacitor 216. When the switch 211 is turned off, the frequency of the clock signal $C_K$ will become higher. The signal generator 250 generates a pulse signal PLS. The pulse signal PLS is utilized to generate the clock signal $C_K$ via an inverter 270.

The pulse signal PLS is further coupled to clock input terminals CK of flip-flops 230 and 231. The frequency modulation signal H/L coupled to an input terminal D of the flip-flop 230 is applied to enable/disable the flip-flop 230. An output terminal Q of the flip-flop 230 generates the on-time adjust signal $S_J$ in response to the pulse signal PLS. The on-time adjust signal $S_J$ is further coupled to an input terminal D of the flip-flop 231 to enable/disable the flip-flop 231 for generating the signal $S_X$ in response to the pulse signal PLS. The signal $S_X$ is generated by an output terminal Q of the flip-flop 231 via an inverter 271. The frequency modulation signal H/L is further connected to reset input terminals R of the flip-flops 230 and 231 to reset the flip-flops 230 and 231. Therefore, the on-time adjust signal $S_J$ is generated to reduce the pulse width of the switching signal $S_W$ before the signal $S_X$ is generated to increase the switching frequency of the switching signal $S_W$.

FIG. 5 is a circuit diagram of an embodiment of the input circuit 300 according to the present invention. The input circuit 300 comprises a feedback circuit and the micro-stepping circuit 350. The feedback circuit includes resistors 310, 325, 326, and a level-shift transistor 315 to receive the feedback voltage $V_{FB}$ for generating an attenuated feedback signal $V_A$. The resistor 310 is coupled between a gate of the level-shift transistor 315 and the supply voltage $V_{CC}$ and applied to pull high the feedback signal $V_{FB}$. A drain of the level-shift transistor 315 is also coupled to the supply voltage $V_{CC}$. A gate of the level-shift transistor 315 is coupled to receive the feedback signal $V_{FB}$ for generating the attenuated feedback signal $V_A$ through the resistors 325 and 326. The attenuated feedback signal $V_A$ represents the feedback signal $V_{FB}$. A terminal of the resistor 325 is coupled to a source of the level-shift transistor 315. The resistor 326 is coupled between the other terminal of the resistor 325 and the ground. The attenuated feedback signal $V_A$ is generated at a joint of the resistors 325 and 326.

A first terminal of a resistor 327 is coupled to the joint of the resistors 325 and 326. A switch 331 is coupled between a second terminal of the resistor 327 and the ground. The resistor 327 is turned on/off by the switch 331. The switch 331 is controlled by the on-time adjust signal $S_J$. When the switch 331 is turned on, the resistor 327 is further parallel connected to the resistor 326 for reducing the level of the attenuated feedback signal $V_A$ and decreasing the pulse width of the switching signal $S_W$. The second protection signal OFF2 is coupled to turn on/off a switch 332. The switch 332 is coupled between the ground and the joint of the resistors 325 and 326. The switch 332 is utilized to connect the attenuated feedback signal $V_A$ to the ground (decrease to zero voltage) for disabling the switching signal $S_W$. Therefore, the switch 332 serves as the protection circuit to disable the switching signal $S_W$ in response to the second protection signal OFF2.

The micro-stepping circuit 350 slowly changes its output in accordance with its input signal. The micro-stepping circuit 350 generates the modulated feedback signal $V_B$ in accordance with the attenuated feedback signal $V_A$ for generating the switching signal $S_W$. That is, the micro-stepping circuit 350 is coupled to receive the feedback signal $V_{FB}$ for generating the switching signal $S_W$. Further, the micro-stepping circuit 350 is coupled to modulate the pulse width of the switching signal $S_W$ step by step in response to the feedback signal $V_{FB}$.

Figure 6:
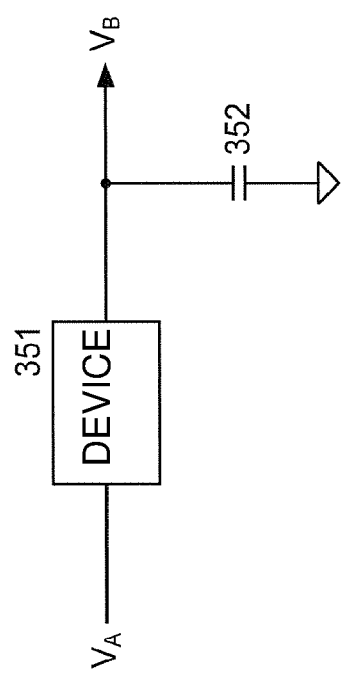
FIG. 6 is a circuit diagram of an embodiment of the micro-stepping circuit according to the present invention.

FIG. 6 is a circuit diagram of an embodiment of the micro-stepping circuit according to the present invention. A resistive device 351 and a capacitor 352 develop a pass filter with a time delay. A first terminal of the resistive device 351 is coupled to receive the attenuated feedback signal $V_A$. The capacitor 352 is coupled between a second terminal of the resistive device 351 and the ground. Therefore, the pass filter generates the modulated feedback signal $V_B$ in accordance with the attenuated feedback signal $V_A$, and the modulated feedback signal $V_B$ has the time delay comparing with the attenuated feedback signal $V_A$.

Figure 7:
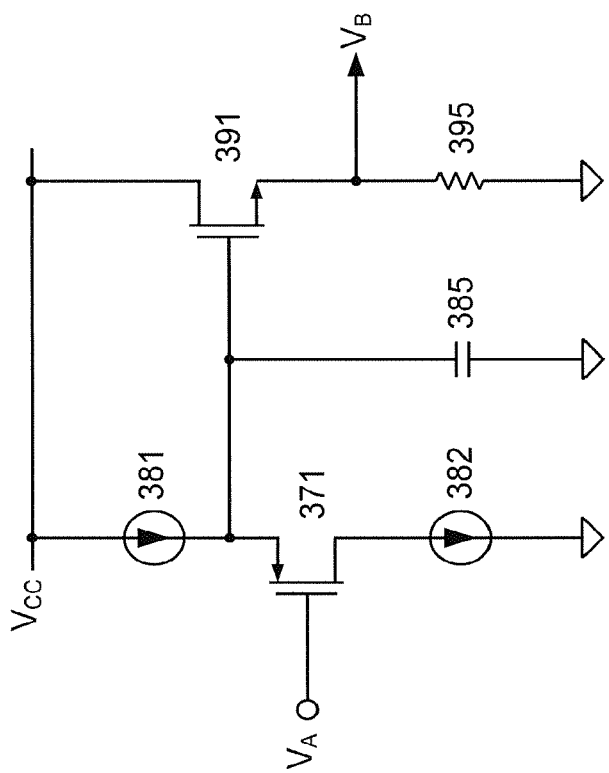
FIG. 7 is a circuit diagram of another embodiment of the micro-stepping circuit according to the present invention.

FIG. 7 is a circuit diagram of another embodiment of the micro-stepping circuit according to the present invention. The micro-stepping circuit comprises two current sources 381 and 382, two transistors 371 and 391, a capacitor 385, and a resistor 395. A terminal of the current source 381 is coupled to the supply voltage $V_{CC}$. The other terminal of the current source 381 is coupled to a source of the transistor 371 and one terminal of the capacitor 385. The other terminal of the capacitor 385 is coupled to the ground. The current source 382 is coupled between a drain of the transistor 371 and the ground. A drain of the transistor 391 is coupled to the supply voltage $V_{CC}$. A gate of the transistor 391 is coupled to the capacitor 385. The resistor 395 is coupled between a source of the transistor 391 and the ground.

A gate of the transistor 371 is coupled to receive the attenuated feedback signal $V_A$. The source of the transistor 371 is further coupled to the gate of the transistor 391 to generate the modulated feedback signal $V_B$ at the joint of the source of the transistor 391 and the resistor 395. The capacitor 385 and the current sources 381, 382 are coupled in between the transistor 371 and the transistor 391 for developing a linear time delay and performing the micro-stepping. The level of the current sources 381, 382 and the capacitance of the capacitor 385 determine the slew rate of the micro-stepping.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A switching control circuit for a power converter, comprising:
   an input circuit coupled to receive a feedback signal wherein the feedback signal is correlated to an output of the power converter; and
   a clock generator configured to generate a clock signal having a frequency to control a switching frequency of a switching signal wherein the switching signal is configured to control switching of a transformer of the power converter for regulating the output of the power converter; and
   the switching control circuit configured to reduce a pulse width of the switching signal without changing the frequency of the clock signal and thereafter increase the frequency of the clock signal.

2. The circuit as claimed in claim 1, wherein the pulse width of the switching signal is reduced before the switching signal is disabled.

3. The circuit as claimed in claim 1, wherein the pulse width of the switching signal is decreased to a specific value before the switching signal is disabled for the protection of the power converter.

4. The circuit as claimed in claim 1, wherein the input circuit is configured to form a modulated feedback signal used to modulate the pulse width of the switching signal in a plurality of steps in response to the feedback signal.

5. The circuit as claimed in claim 4, wherein the input circuit further comprises a feedback circuit configured to receive the feedback signal and to generate an attenuated feedback signal, and also includes a micro-stepping circuit configured to generate a modulated feedback signal in accordance with the attenuated feedback signal.

6. The circuit as claimed in claim 5, further comprising a logic circuit configured to generate the switching signal in response to the modulated feedback signal and the clock signal, the control circuit configured to reduce the pulse width of the switching signal by changing a value of the modulated feedback signal.

7. The circuit as claimed in claim 1, wherein the power converter is configured to form the switching signal to facilitate operation of a synchronous rectifier at a secondary side of the transformer.

8. The switching control circuit of claim 1 wherein the switching control circuit is configured to reduce the pulse width of the switching signal during a first interval of the clock signal and to increase the frequency of the clock signal during a next interval of the clock signal.

9. A control circuit for a power converter, comprising:
a feedback circuit coupled to receive a feedback signal that is correlated to an output of the power converter;
a clock circuit configured form a clock signal at a frequency;
the control circuit configured to form a switching signal at the frequency of the clock signal, the switching signal configured to switch a transformer of the power converter for regulating the output of the power converter;
a micro-stepping circuit configured to form a modulated feedback signal that slowly changes over a time interval and is correlated to the output of the power converter wherein the modulated feedback signal is used to form a pulse width of the switching signal; and
the control circuit configured to receive a control signal requesting an increase of the frequency of the clock signal, the control circuit configured to adjust a value of the modulated feedback signal in response to the control signal to cause the pulse width of the switching signal to be decreased without increasing the frequency of the clock signal and to then increase the frequency of the clock signal independently of a value of the feedback signal.

10. The circuit as claimed in claim 9, wherein the power converter comprises a synchronous rectifier at a secondary side of the transformer.

11. The circuit as claimed in claim 9, wherein under the condition of the control circuit operating in a protection state, the control circuit configured to reduce the pulse width of the switching signal before the control circuit increases the frequency of the switching signal.

12. The circuit as claimed in claim 11, wherein the pulse width of the switching signal is decreased to a specific value before the switching signal is disabled for the protection of the power converter.

13. A controller circuit for a power converter, comprising:
a switching circuit coupled to receive a feedback signal that is correlated to an output of the power converter for generating a switching signal, the switching signal configured to switch a transformer of the power converter for regulating the output of the power converter;
a protection circuit configured to disable the switching signal in response to the protection of the power converter; and
the switching circuit configured to form a frequency of a clock signal used to form a switching frequency of the switching signal;
the switching circuit configured to, during a first clock interval form a pulse of the switching signal and to decrease a pulse width of the switching signal without changing the frequency of the clock signal, and during a next clock interval change the frequency of the clock signal.

14. The controller circuit as claimed in claim 13, wherein the power converter comprises a synchronous rectifier at a secondary side of the transformer.

15. The controller circuit as claimed in claim 13, further comprising:
a clock generator configured to form the clock signal to control the switching frequency of the switching signal; wherein the pulse width of the switching signal is reduced before the switching frequency is changed from a low frequency to a high frequency.

16. The controller circuit as claimed in claim 13, wherein the pulse width of the switching signal is decreased to a specific value before the switching signal is disabled for the protection of the power converter.

17. The controller circuit as claimed in claim 13, wherein the switching circuit further comprises a micro-stepping circuit coupled to receive the feedback signal for generating the switching signal, the micro-stepping circuit configured to modulate the pulse width of the switching signal step by step in response to the feedback signal.

18. The controller circuit as claimed in claim 13, wherein the switching circuit further comprises a micro-stepping circuit configured to receive the feedback signal and form a modulated feedback signal for generating the switching signal, the micro-stepping circuit configured to modulate the feedback signal substantially linearly to form the modulated feedback signal.

19. The controller circuit as claimed in claim 13, wherein the switching circuit further comprises an input circuit configured to receive the feedback signal and form a modulated feedback signal for generating the switching signal, the input circuit configured reduce a value of the modulated feedback signal in response to receiving a signal to increase the frequency of the clock signal.

20. The controller circuit as claimed in claim 19, wherein the input circuit is configured reduce the value of the modulated feedback signal just prior to the control circuit increasing the frequency of the clock signal.

\* \* \* \* \*